United States Patent [19]

Kurasawa et al.

[11] Patent Number: 5,349,473
[45] Date of Patent: Sep. 20, 1994

[54] GRADIENT INDEX OPTICAL ELEMENT

[75] Inventors: Yuko Kurasawa, Hachiohji; Satoshi Noda, Akishima; Morinao Fukuoka, Hachiohji, all of Japan

[73] Assignee: Olympus Optical Company Limited, Japan

[21] Appl. No.: 967,839

[22] Filed: Oct. 28, 1992

[30] Foreign Application Priority Data

Oct. 28, 1991 [JP] Japan .................. 3-308510

[51] Int. Cl.$^5$ .............................. G02B 3/00
[52] U.S. Cl. ...................... 359/654; 359/653; 359/652; 385/124; 385/144; 385/142
[58] Field of Search ............. 359/652, 653, 654; 385/142, 144, 124

[56] References Cited

U.S. PATENT DOCUMENTS

| 3,859,103 | 1/1975 | Yoshiyagawa et al. | 385/124 |
|---|---|---|---|
| 4,025,156 | 5/1977 | Gloge et al. | 385/142 |
| 4,229,070 | 10/1980 | Olshansky et al. | 385/124 |
| 4,339,174 | 7/1982 | Levin | 385/124 |
| 4,418,985 | 12/1983 | Kasori et al. | 385/144 |
| 4,439,008 | 3/1984 | Joormann et al. | 385/142 |
| 4,462,663 | 7/1984 | Shimizu et al. | 359/654 |
| 5,166,827 | 11/1992 | Noda | 359/654 |
| 5,171,344 | 12/1992 | Noda | 385/124 |

OTHER PUBLICATIONS

Kita et al., "Light-Focusing Glass Fibers and Rods", Journal of the American Ceramic Society, vol. 54, No. 7, Jul. 1971, pp. 321–326.
Ohmi et al., "Gradient-Index Rod Lens Made By A Double Ion-Exchange Process", Applied Optics, vol. 27, No. 3, Feb. 1, 1988, pp. 496–499.
Yamane et al., "Gradient-Index Glass Rods of PbO-K$_2$O-B$_2$O$_3$-SiO$_2$ System", Journal of Non-Crystalline Solids, vol. 100 (1988) pp. 506–510.
Shingyouchi et al., "Radial Gradient Refractive-Index Glass Rods Prepared by Sol-Gel Method", Electronics Letters, vol. 22, No. 2, Jan. 16, 1986, pp. 99–100.
Shingyouchi et al., "r-Grin TiO$_2$-SiO$_2$ Glass Rods Prepared By A Sol-Gel Method", Electronics Letters, vol. 22, No. 21, Oct. 9, 1986, pp. 1108–1110.

Primary Examiner—Loha Ben
Assistant Examiner—Thomas Robbins
Attorney, Agent, or Firm—Bruce L. Adams; Van C. Wilks

[57] ABSTRACT

A gradient index optical element has at least one first metal dopant selected from the group consisting of La, Y, Ga, In, Ge, Sn, Zn, Zr, Ba, Ca, As, Sr, Gd and Be distributed at a concentration gradient in a glass medium. The concentration gradient of the first metal dopant defines a slope having a direction. At least one second metal dopant different from the first metal dopant and selected from the group consisting of Bi, Sb, Nb, Ti, Ta, Pb, Tl, Zr, In, Sn, Y, Ba, Ca and Sr is distributed at a concentration gradient in the glass medium. The concentration gradient of the second metal dopant defines a slope smaller than the slope of the concentration gradient of the first metal dopant. The slope of the concentration gradient of the second metal dopant is in the same direction as the slope of the concentration gradient of the first metal dopant. The thus obtained gradient index optical element has excellent chromatic aberration correction in which the Abbe number increases as the refractive index becomes large, or the change of the Abbe number is small as the refractive index increases.

22 Claims, 2 Drawing Sheets

METAL CONTENT

METAL CONTENT

GRADIENT INDEX OPTICAL ELEMENT

BACKGROUND OF THE INVENTION

1. Field of the invention

The present invention relates to a gradient index optical element for use as an optical lens for as a camera, a microscope or the like.

2. Description of the Related Art

A gradient index optical element has a power (refractive power) in its medium by imparting a distribution of refractive index to the medium. This power is determined by the refractive index distribution, so that in order to make the power large, the absolute value $|\Delta n|$ of a difference $\Delta n$ in the refractive index n must be rode large. Hitherto, many attempts of making the absolute value $|\Delta n|$ large have been done by many searchers. For example, an optical element which is commercially available under the of SELFOC lens (Tradename) has a large absolute value $|\Delta n|$ made by imparting a concentration gradient of Tl to the medium by ion exchange (Journal of The American Ceramic Society, vol. 54, No. 7(1971), pp321-326). Also a lens of $|\Delta n| \approx 0.059$ was obtained by imparting a concentration gradient of Ag to the medium by a double ion exchange method (Applied Optics, vol. 27, No. 3(1988), pp496-499). Moreover, a lens of $|\Delta n| \approx 0.04$ was obtained by imparting a concentration gradient of Pb and K to the medium by the sol-gel method (J. Non-cry.sol.100, 506, 1988), as well a lens of $|\Delta n| \Delta \approx 0.03$ was obtained by imparting a concentration gradient of Ti or Ge to the medium by the solgel method (Elect. Lett.22, 99(1986), Elect .Lett.22, 1108(1986)). However, the developments of gradient index optical element up to the present have been mainly an approach of increasing the absolute value $|\Delta n|$, but methods of decreasing the chromatic aberration possessed by the optical elements themselves have not been adequately developed. In designing optical elements, it is possible to drastically decrease the number of lenses used for constructing an optical system for a lens system of a camera using the excellent aberration correction ability of the gradient index optical element, but there is an inconsistency in that the chromatic aberration correction of the lens system becomes more difficult as the number of the lenses decreases.

In order to make a lens systems in which the number of lenses is small and in which the chromatic aberration is corrected, it is important to decrease the chromatic aberration generated in each lens. Therefore, as the gradient refractive index optical element, it is desirable to obtain an optical element having a gradient of a direction A on the $n_d - \nu_d$ graph as shown in FIG. 5, i.e. an optical element having an increasing Abbe number $\nu d$ as the refractive index $n_d$ increases (refer to Japanese Patent Laid-open No. 141,302/91).

Then, the gradient index optical element is obtained by imparting a gradient of refractive index to the medium on the basis of a gradient of concentration of metal oxide in a glass. The optical property of the glass is determined by its oxide composition. In the case of a glass having its principle component of $SiO_2$, metal oxides except for Si a have property in that the refractive index is high as compared with $SiO_2$ glass and dispersion becomes large (that is, the Abbe number becomes small), so that if the gradient index optical element is obtained by imparting a concentration gradient to these metal dopants, only the gradient index optical element having a gradient of a direction B on the $n_d - \nu_d$ graph shown in FIG. 5 is obtained.

Japanese Patent Laid-open No. 141,302/91 discloses a gradient index optical element obtained by imparting a concentration distributions in opposite directions to each other to the medium with the use of two or more metals, in which the chromatic property may be variously changed. However, it is difficult to obtain the gradient index optical element, since the above method of imparting concentration distributions of two metals in opposite directions to each other is limited. That is, hitherto, it is difficult to obtain the optical element having a chromatic property of the direction A on the $n_d - \nu_d$ graph shown in FIG. 5, which is desired in designing of an optical device.

Furthermore, the chromatic property of the gradient index optical element can be variously changed when one of two or more metal dopants is flatly distributed as an absolute amount and the other remaining metal dopant is distributed at a certain slope. A method for attaining such a distribution state may easily be realized as compared with the method of distributing two metals in directions opposite to each other. However, it is still difficult to flatly distribute one metal dopant as its absolute amount.

SUMMARY OF THE INVENTION

It is an object of the present invention to overcome the above described disadvantages of the conventional gradient index optical elements.

It is another object of the present invention to provide a gradient index optical element in which chromatic aberration correction is excellent, that is, the Abbe number becomes large as the refractive index becomes large, or the change in Abbe number is small relative to the increase of refractive index.

According to a first aspect of the present invention, there is provided a gradient index optical element comprising at least one of first metal dopants g selected from a metal group G1 of La, Y, Ca, In, Ge, Sn, Zn, Zr, Ba, Ca, As, Sr, Gd and Be and distributed in a medium with a slope, and at least one of second metal dopants f selected from a metal group F1 of Bi, Sb, Nb, Ti, Ta, Pb, Tl, Zr, In, Sn, Y, Ba, Ca and Sr different from the first metal dopant g and distributed in the same direction as in the first metal dopant g with a slope smaller than that of the first metal dopant g.

In a preferable embodiment, the first metal dopant g is selected from a metal group G2 of La, Ca, In, Ge, Sn, Zn and Zr, and the second metal dopant f is selected from a metal group F2 of Bi, Sb, Nb, Ti, Ta, Pb and Tl.

In another preferable embodiment, the first metal dopant g is selected from a metal group G3 of Ba, Ca, As, Sr, Y and Gd, and the second metal dopant f is selected from a metal group F3 of Bi, Sb, Nb, Ti, Ta, Pb, Tl, Zr, In and Sn.

In the other preferable embodiment, the first metal dopant g is Be and the second metal dopant f is selected from a metal group F4 of Bi, Sb, Nb, Ti, Ta, Pb, Tl, Zr, In, Sn, Y, Ba, Ca and Sr.

According to a second aspect of the present invention, there is provided a gradient index optical element comprising at least one of first metal dopants g selected from a metal group G5 of As, La, In and Y and at least one of second metal dopants f selected from a metal group F5 of Bi. Sb. Nb, Ti, Ta, Pb and Tl, in which the first and second metal dopants g and f are distributed in the same direction in a medium and a content of the second metal dopant f is not less than 20 mol % in a greatest portion of the second metal dopant distribution.

In a preferable embodiment, the first and second metal dopants g and f are distributed in such a manner that an absolute amount of each dopant is largest in a central portion of the optical element and decreases in an approximately parabolic shape toward the surface of the optical element.

In another preferable embodiment, the first and second metal dopants g and f are distributed in such a manner that an absolute amount of each dopant is smallest in a central portion of the optical element and increases in an approximately parabolic shape toward the surface of the optical element.

In the other preferable embodiment, the maximum value of content of the first metal dopant g as an oxide conversion is 5–40 mol % and the maximum value of content of the second metal dopant f as an oxide conversion is 2–40 mol %.

Thus, the present invention easily provides gradient index optical elements having an excellent chromatic aberration correction, that is, gradient index optical elements in which the Abbe number becomes large as the refractive index becomes large or the change in Abbe number is small relative to the increase of refractive index.

DESCRIPTION OF THE PREFERRED EMBODIMENT

The inventor has found out that the gradient index optical element comprising a first metal dopant g selected from the metal group G1 (La, Y, Ca, In, Ge, Sn, Zn, Zr, Ba, Ca, As, Sr, Gd and Be) and distributed in a medium with a slope, and a second metal dopant f selected from the metal group F1 (Bi, Sb, Nb, Ti, Ta, Pb, Tl, Zr, In, Sn, Y, Ba, Ca and Sr) and distributed in the same direction as in the first metal dopant g with a slope smaller than that of the first metal dopant g obtains an optical element having an excellent chromatic aberration correction. Even when the metal selected from the metal group G1 has a concentration gradient as the first metal dopant g, if the second metal dopant f is not selected from the metal group F1, the optical element having a given chromatic property can not be obtained. Furthermore, the inventor has made various studies and found out that a more favorable effect is developed when the metal dopants g and f are any one of the following combinations.

(1) a combination of first metal dopant g selected from the metal group G2 (La, Ca, In, Ge, Sn, Zn and Zr) and second metal dopant f selected from the metal group F2 (Bi, Sb, Nb, Ti, Ta, Pb and Tl);

(2) a combination of first metal dopant g selected from the metal group G3 (Ba, Ca, As, Sr, Y and Gd) and second metal dopant f selected from the metal group F3 (Bi, Sb, Nb, Ti, Ta, Pb, Tl, Zr, In and Sn);

(3) a combination of Be as first metal dopant g and second metal dopant f selected from the metal group F4 (Bi, Sb, Nb, Ti, Ta, Pb, Tl, Zr, In, Sn, Y, Ba, Ca and Sr).

Figure 1:
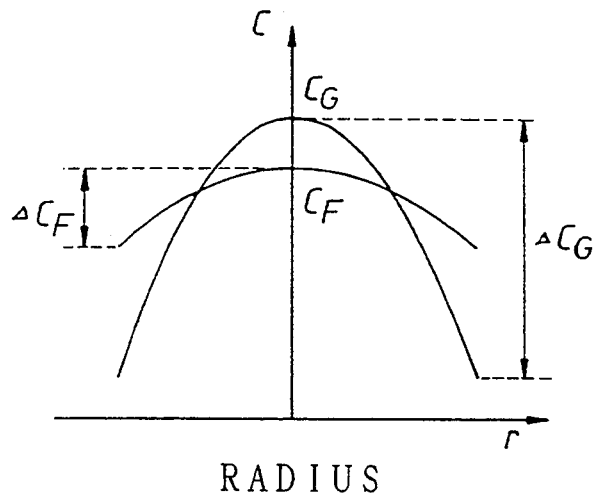
FIG. 1 is a graph showing a metal content distribution of an embodiment of the gradient index optical element according to the present invention.
Figure 2:
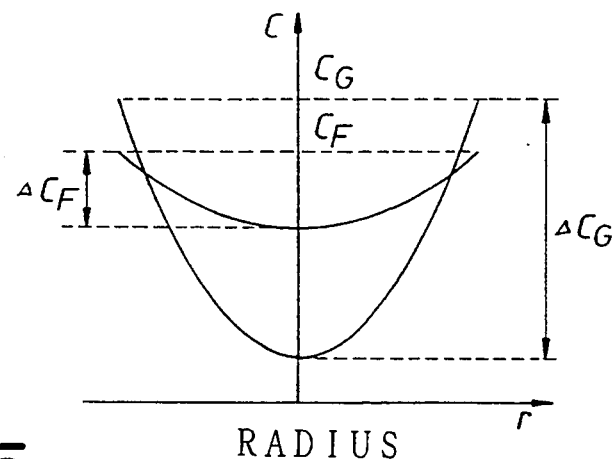
FIG. 2 is a graph showing a metal content distribution of another embodiment of the gradient index optical element according to the present invention.

Moreover, it has been found that in the radial gradient index optical element having the above metal dopant combination, when the absolute amount of the first metal dopant g is largest in the central portion of the optical element and decreases substantially in parabolic shape toward the peripheral portion thereof, and the second metal dopant f is distributed in the same direction as in the first metal dopant g with a slope smaller than that of the first metal dopant g as shown in FIG. 1, optical elements having a small amount of chromatic aberration are obtained. And also, a similar effect is obtained when the distribution direction of the first metal dopant g is reverse (see FIG. 2).

Further, it has been found that gradient index optical elements having a small amount of chromatic aberration are obtained when the first metal dopant g selected from the metal group G5 (As, La, In, Y) and the second metal dopant f selected from the metal group F5 (Bi, Sb, Nb, Ti, Ta, Pb, Tl) are distributed in the same direction in the glass medium and the content of the second metal dopant f is not less than 20 mol % at a maximum distribution portion of the second metal dopant f, even if the distribution gradient of the second metal dopant f is small or large with respect to the distribution gradient of the first metal dopant g. When the distribution gradient of the second metal dopant f is large with respect to the distribution gradient of the first metal dopant g, the above effect is first obtained by restricting to a case that at least one of each of the first and second metal dopants g and f from the metal groups G5 and F5 is included in such a manner that the second metal dopant f is not less than 20 mol %.

According to the present invention, the gradient index optical element having metal dopants and their distribution state as mentioned above is satisfactorily produced by distributing plural metal dopants in the same direction, so that the difficulty in the production of such as a distribution of two metals into opposite directions or distribution of one metal dopant at flat state can be avoided, whereby the gradient index optical element having a small amount of chromatic aberration can be produced relatively easily.

The optimum content of each metal differs in accordance with the included metal dopant and the aimed optical properties, so that it is difficult to clearly define the content. However, it is desirable that the total content Cg of the first metal dopants g as an oxide conversion is 5–40 mol % and the total content Cf of the second metal dopants f as an oxide conversion is 2–40 mol % at a position that the absolute amount of the first metal dopant g is maximum.

Moreover, it is known that the amount of chromatic aberration can be optionally changed by varying the selection of metal dopant and content of each metal dopant.

Figure 5:
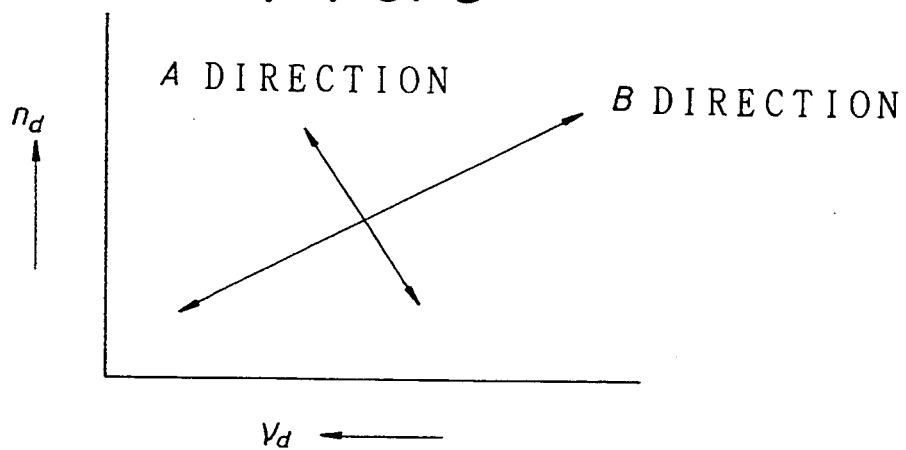
FIG. 5 is an explanatory graph showing preferable and unfavorable relationships between refractive index and Abbe number in a gradient index optical element.
Figure 3:
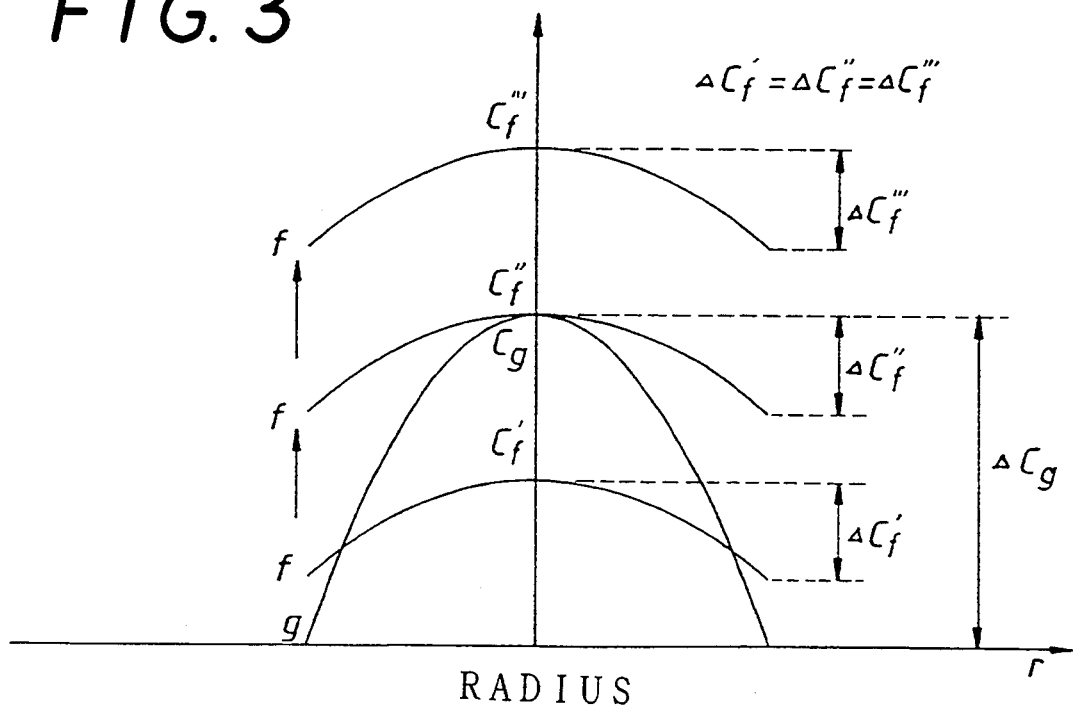
FIG. 3 is an explanatory graph showing a metal content distribution when Cg, ΔCg and ΔCf are constant and Cf is changed.

When the first and second metal dopants g and f are selected and the total content Cg as an oxide at the maximum position of the first metal dopant g and the distribution gradients ΔCg, ΔCf of the first and second metal dopants g and f are constant, if the content Cf of the second metal dopant f increases (FIG. 3), the arrow for the chromatic property in FIG. 5 is upward to the left or is in the direction A. On the other hand, if the content of the second metal dopant f decreases, the optical element shows the chromatic property of the direction B in FIG. 5. Therefore, in order to obtain the optical element having the aimed chromatic property, it is desirable to include the second metal dopant f in a certain content or more. The lower limit of the content of the second metal dopant f is dependent upon the kind and distribution gradient of the first and second metal dopants g and f as previously mentioned, but the lower limit of the content of every kind of the second metal dopant f is desirable to be values shown in Tables 1 and 2.

Furthermore, the desired lower limit of the content of the second metal dopant f changes in accordance with the combination of the first and second metal dopants g and f. Table 3 shows an effective relationship of the content of second metal dopant f to metal dopants selected from the metal groups G and F.

TABLE 1

Effective relationship between metal dopant f and its content (in case of containing no Be as metal dopant g)

| Metal dopant f | Effective content of metal dopant f |
|---|---|
| Nb, Ta, Ti, Bi, Sb, Tl | 2 ≦ |
| Pb, Zr | 5 ≦ |
| Sn, In, Y | 10 ≦ |

(mol % of metal dopant f as oxide conversion at a position that an absolute amount of metal dopant g is maximum)

TABLE 2

Effective relationship between metal dopant f and its content (in case of containing Be as metal dopant g)

| Metal dopant f | Effective content of metal dopant f |
|---|---|
| Ba, Ca, Sr, Y | 2 ≦ |
| Pb, Nb, Ta, Ti, Bi, Tl, Sn, Zr, In, Sb | 5 ≦ |

(mol % of metal dopant f as oxide conversion at a position that an absolute amount of metal dopant g is maximum)

TABLE 3

Effective relationship content of metal dopant f to combination of metal dopants g and f

| Metal dopants f | Metal dopant g | Effective content of metal dopant f |
|---|---|---|
| Nb, Ta, Ti, Bi, Sb, Tl | La, Ba, Ca, As, Sr, Gd | 2 ≦ |
| Bi | Y, Ge | |
| Tl | Sn, In, Y, Ge, Zn, Ga | |
| Y, Ca, Ba, Sr | Be | |
| Nb, Ta, Ti, Sb | In, Y, Ge, Ga, Be | 5 ≦ |
| Pb | La, Y, Ba, Ca, As, Sr, Gd, Be | |
| Bi | Sn, In, Zn, Ga, Be | |
| Tl | Zr, Be | |
| Zr | Ba, Gd, Be | |
| In, Sn | Be | |
| Nb, Ti, Sb | Sn, Zn | 10 ≦ |
| Bi | Zr | |
| Pb | In, Ge, Zn, Ga | |
| Zr | Ca, As, Sr | |
| Sn | Sr, Gd | |
| In, Y | Ba, Sr, As, Gd | |
| Nb, Sb, Ti | Zr | 15 ≦ |
| Zr, In | La | |
| Sn | La, Ba, Ca, As | |

TABLE 3-continued

Effective relationship content of metal dopant f to combination of metal dopants g and f

| Metal dopants f | Metal dopant g | Effective content of metal dopant f |
|---|---|---|
| Ta, Pb | Sn | |

(mol % of metal dopant f as oxide conversion at a position that absolute amount of metal dopant g is maximum)

Figure 4:
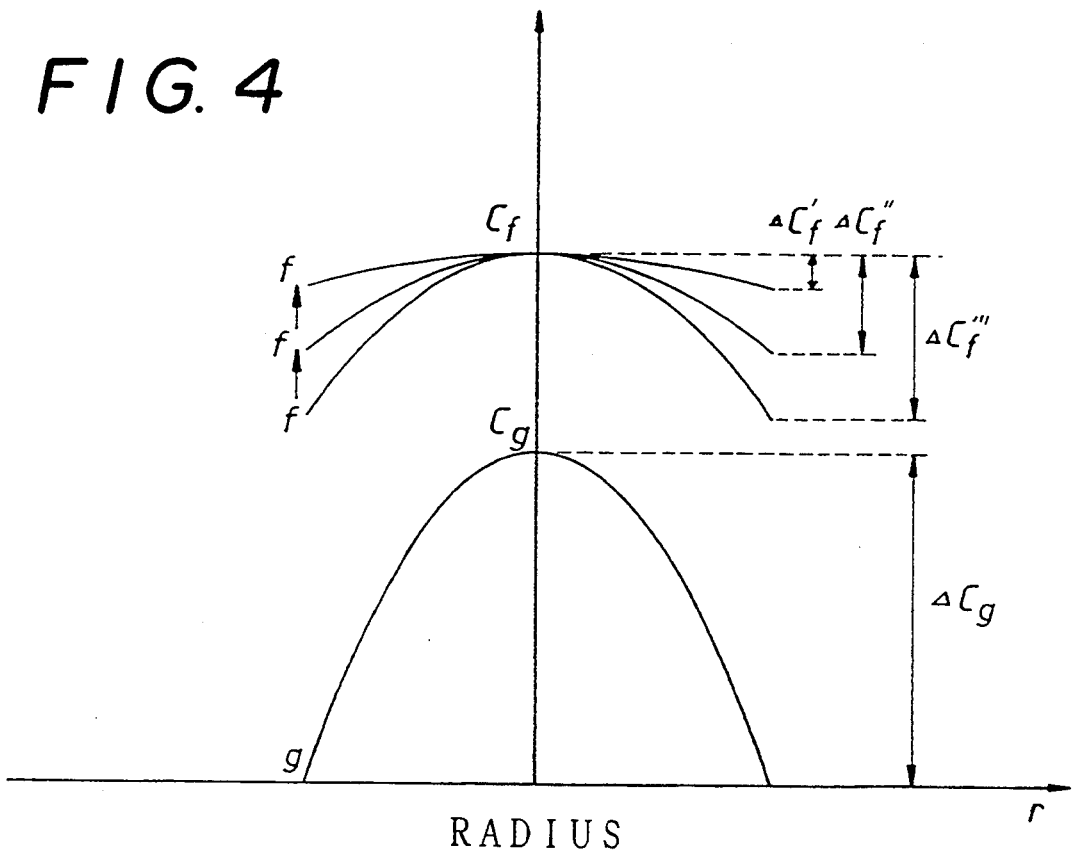
FIG. 4 is an explanatory graph showing a metal content distribution when Cg, Cf and ΔCg are constant and ΔCf is changed.

When the content Cf of the second metal dopant f in the maximum distribution of the metal dopant f is constant, if the distribution gradient of the second metal dopant f (difference in content as oxide conversion of metal dopant f between peripheral portion and central portion ΔCf) is small (FIG. 4), the chromatic property of the optical element shows the direction A of FIG. 5, while if the second metal dopant f has a large distribution, the optical element shows the direction B of FIG. 5. Therefore, in order to obtain the optical element having the aimed chromatic property, it is desired that the distribution gradient ΔCf of the second metal dopant f becomes not so large. That is, there is an upper limit on a ratio of difference ΔCf in content of second metal dopant f as oxide conversion between peripheral portion and central portion to difference ΔCg in content of first metal dopant g as oxide conversion between peripheral portion and central portion (ΔCf/ΔCg, hereinafter called as distribution ratio). Such an upper limit (ΔCf/ΔCg) is variable in accordance with the kinds of the first and second metal dopants g and f selected and ratio as oxide conversion of second metal dopant f to first metal dopant g (Cf/Cg).

For example, when the total ratio as oxide conversion of second metal dopant f to first metal dopant g (Cf/Cg) is not more than 1.4 at such a position that the absolute amount of the first metal dopant g is largest, it is desirable that the distribution ratio of Nb as second metal dopant f to As as first metal dopant g (ΔOf/ΔCg) is not more than 0.5. Further, it is desirable that the distribution ratio of Ta or Zr as second metal dopant f to Ba or Be as first metal dopant g (ΔCf/ΔCg) is not more than 0.3.

The effective relationship between the selected metal dopant and its distribution ratio is shown in Table 4 when the total ratio as oxide conversion (Cf/Cg) is not more than 1.4. Similarly, the effective relationship between the selected metal dopant and its distribution ratio is shown in Table 5 when the total ratio as oxide conversion (Cf/Cg) is more than 1.4 but not more than 4.

TABLE 4

Effective relationship between metal dopant and distribution ratio (ΔCf/ΔCg) (Cf/Cg ≦ 1.4)

| Metal group G | Metal group F | ΔCf/ΔCg |
|---|---|---|
| As | In, Sn | ≦0.1 |
| Ba | Sn | |
| Zr | Sb | |
| As, Ba, Be, Sr, Ca, Gd | Zr | ≦0.3 |
| Ba, Be, Sr, Gd | In | |
| La, Y, Ga, Ba, Be, Sr, In, Ge, Ca, Sn, Zn | Pb | |
| La, Y, Ga, Ba, Be, Sr, In, Ge, Ca | Ta | |
| La, Ga, Ba, Be, Sr, In, Ge, Ca, Sn, Zr, Zn | Ti | |
| La, Y, Ga, Be, Sr, In, Ge, Ca, Sn, Zn | Nb | |
| Ga, Be, Sr, In, Ge, Ca, Sn | Sb | |
| Be, Sr, In, Ge, Ca, Sn, Zr, Zn | Bi | |
| Be | Y, Ba | |
| Sr | Sn | |

TABLE 4-continued

Effective relationship between metal dopant and distribution ratio
($\Delta Cf/\Delta Cg$) (Cf/Cg $\leq$ 1.4)

| Metal group G | Metal group F | $\Delta Cf/\Delta Cg$ |
|---|---|---|
| Be | Ca, Sr | $\leq 0.5$ |
| As, Gd | Ta, Pb | |
| As, Y, Gd | Ti | |
| As, Ba, Gd | Nb | |
| As, La, Y, Ba, Gd | Sb | |
| As, La, Y, Ga, Ba, Gd | Bi | |
| As, La, Y, Ga, Ba, Be, Sr, In, Ge, Ca, Sn Zr, Zn, Gd | Tl | |

TABLE 5

Effective relationship between metal dopant and distribution ratio
($\Delta Cf/\Delta Cg$) (1.4 < Cf/Cg $\leq$ 4)

| Metal group G | Metal group F | $\Delta Cf/\Delta Cg$ |
|---|---|---|
| Zr | Sb, | $\leq 0.4$ |
| Sn, Zr | Nb | |
| Ge | Ti | |
| In | Ta | |
| Zr, Zn, | Pb | |
| Y | Zr | |
| Sr | In, Sn | |
| Be, Ca, Sn, Zr | Bi | $\leq 0.6$ |
| Be, Ca, Sn | Sb | |
| Ga, Ca, Be | Nb | |
| Ca, Sn, Zr, Be | Ti | |
| Ga, Be | Ta | |
| Ba, Sr, Ge, Ca, Sn, Be | Pb | |
| La, Ba, Sr, Be | Zr | |
| Ba, Be, Gd | In | |
| As, Ba, Be, Gd | Sn | |
| Be | Ba, Y, Ca, Sr | |
| Ga, Ba, Sr, Ge, Gd | Bi, Tl | $\leq 0.8$ |
| Ga, Ba, Sr, In, Gd | Sb | |
| Y, Ba, Sr, In, Gd | Nb | |
| Ga, Ba, Sr, Gd | Ti | |
| La, Y, Ba, Sr, Gd | Ta | |
| Y, Ga, In, Gd | Pb | |
| As, Gd | Zr | |
| Ca, Sn, Zr, Gd, Ba, Sr, Ge, Zn | Tl | |
| As, La, In, Y | Bi, Ti, Tl | $\leq 1.5$ |
| As, La, Y | Sb | |
| As, La | Nb, Pb | |
| As | Ta | |

As seen from Tables 4 and 5, the upper limit of effective $\Delta Cf/\Delta Cg$ tends to become large as the value of Cf/Cg becomes larger.

As the first and second metal dopants g and f, it is possible to simultaneously select two or more metal dopants from each of the metal groups G and F. In this case, $\Delta Cf$, $\Delta Cg$ are calculated from total content Cf, Cg of the metal oxides in each metal group and applied to the values in Tables 1 to 5. Further, when metals in different columns are simultaneously selected, it is desirable to adopt the value of distribution ratio in the metal pair belonging to lower column.

The following examples are given in illustration of the present invention and are not intended as limitations thereof.

EXAMPLE 1

In this example, the central portion has a composition of $TiO_2$: 15 mol %, $Y_2O_3$: 15 mol % and $SiO_2$: 70 mol %, while the content of $Y_2O_3$ is decreased in an approximately parabolic shape from the central portion toward the peripheral portion by eluting $Y_2O_3$ and $TiO_2$ in such a manner that $Y_2O_3$ a content in the peripheral portion is zero, and also the absolute content of $TiO_2$ somewhat decreases toward the peripheral portion. That is, the radial gradient index optical element of this example has compositions of $70SiO_2$—$15TiO_2$—$15Y_2O_3$ in the central portion and $70SiO_2$—$12TiO_2$—$0Y_2O_3$ in the peripheral portion.

As a result of the measurement on the refractive index distribution of this gradient index optical element, the central portion is $n_d=1.728$ and $\nu_d=36.6$ and the peripheral portion is $n_d=1.626$ and $\nu_d=33.5$, from which it is found to have a chromatic property of the direction A in FIG. 5 as $\Delta n_d = -0.092$ and $\Delta \nu_d = -3.1$. The optical element of this example can be judged to be excellent in the chromatic aberration correction and used as a very useful gradient index optical element.

EXAMPLES 2–16

These examples are gradient index optical elements having a metal dopant selected from each of the metal groups G and F and metal contents in central and peripheral portions as shown in Table 6.

TABLE 6

| | | Si content | Metal group G | | Metal group F | | Properties | | Distribution ratio $\Delta C_f/\Delta C_g$ (C$_f$/C$_g$) |
|---|---|---|---|---|---|---|---|---|---|
| | | Si content | metal | content | metal | content | $\Delta N_d$ | $\Delta \nu_d$ | |
| Ex. 2 | central | 80 | La | 16 | Tl | 4 | −0.086 | −0.7 | 0.03 |
| | peripheral | 80 | La | 0 | Tl | 3.5 | | | (0.25) |
| Ex. 3 | central | 70 | Be | 20 | Sr | 5 | −0.045 | 0.0 | 0.15 |
| | peripheral | 70 | Be | 0 | Sr | 2 | | | (0.25) |
| Ex. 4 | central | 60 | La | 20 | Bi | 20 | −0.135 | −0.4 | 0.4 |
| | peripheral | 60 | La | 0 | Bi | 12 | | | (1.0) |
| Ex. 5 | central | 60 | La | 20 | Nb | 20 | −0.094 | −1.5 | 0.25 |
| | peripheral | 60 | La | 0 | Nb | 15 | | | (1.0) |
| Ex. 6 | central | 60 | Zn | 20 | Ti | 20 | −0.030 | −0.1 | 0.1 |
| | peripheral | 60 | Zn | 0 | Ti | 18 | | | (1.0) |
| Ex. 7 | central | 55 | Zr | 18 | Sb | 27 | −0.020 | −0.2 | 0.056 |
| | peripheral | 55 | Zr | 0 | Sb | 26 | | | (1.5) |
| Ex. 8 | central | 60 | Ba | 0 | Sb | 20 | +0.046 | +0.3 | 0.33 |
| | peripheral | 60 | Ba | 15 | Sb | 25 | | | (1.67) |
| Ex. 9 | central | 60 | Zr | 15 | Bi | 25 | −0.032 | −0.1 | 0.07 |
| | peripheral | 60 | Zr | 0 | Bi | 22 | | | (1.67) |
| Ex. 10 | central | 57 | Zr | 15 | Nb | 28 | −0.035 | 0.3 | 0.20 |
| | peripheral | 57 | Zr | 0 | Nb | 25 | | | (1.87) |
| Ex. 11 | central | 70 | As | 10 | Pb | 20 | −0.072 | −0.8 | 0.3 |
| | peripheral | 70 | As | 0 | Pb | 17 | | | (2.0) |
| Ex. 12 | central | 50 | Ba | 15 | Pb | 35 | −0.048 | −0.8 | 0.38 |
| | peripheral | 50 | Ba | 2 | Pb | 30 | | | (2.33) |

TABLE 6-continued

| | | Si content | Metal group G | | Metal group F | | Properties | | Distribution ratio $\Delta C_f/\Delta C_g$ ($C_f/C_g$) |
|---|---|---|---|---|---|---|---|---|---|
| | | Si content | metal | content | metal | content | $\Delta N_d$ | $\Delta \nu_d$ | |
| Ex. 13 | central | 60 | In | 10 | Ti | 30 | −0.056 | −0.6 | 0.4 |
| | peripheral | 60 | In | 0 | Ti | 26 | | | (3.0) |
| Ex. 14 | central | 60 | La | 10 | Ta | 30 | −0.048 | −0.2 | 0.6 |
| | peripheral | 60 | La | 0 | Ta | 24 | | | (3.0) |
| Ex. 15 | central | 55 | As | 10 | Sn | 35 | −0.039 | −0.1 | 0.5 |
| | peripheral | 55 | As | 0 | Sn | 30 | | | (3.5) |
| Ex. 16 | central | 52 | La | 10 | Ti | 38 | −0.108 | 0.0 | 1.2 |
| | peripheral | 52 | La | 0 | Ti | 26 | | | (3.8) |

(mol % as oxide conversion at a position that absolute amount of metal dopant g is maximum)

The metal dopants of the metal groups G and F are distributed in the same direction in an approximately parabolic shape, in which the distribution gradient of the metal dopant selected from the metal group F is smaller than that of the metal dopant selected from the metal group G. In the optical properties or Table 6, negative value of $\Delta n_d$ means that the optical element has a refractive index distribution of a convex shape in which the refractive index is high in the central portion, while positive value of $\Delta n_d$ means a refractive index distribution of a concave shape. Further, a positive value for product of $\Delta n_d$ and $\Delta \nu_d$ exhibits that the chromatic property of the resulting glass is in the direction A of FIG. 5, from which it is apparent that the optical element is small in the chromatic aberration and has excellent optical properties.

EXAMPLES 17-20

These examples are radial gradient index optical elements having one or more metal dopants selected from each of the metal groups G and F and metal contents as oxide conversion in central and peripheral portions as shown in Table 7, in which the distribution of the metal dopant of the metal group G decreases in an approximately parabolic shape toward the peripheral portion and the metal dopant of the metal group F decreases with a distribution gradient smaller than that of the metal group G.

TABLE 7

| | | Si content | Metal group G | | Metal group F | | Properties | | Distribution ratio $\Delta C_f/\Delta C_g$ ($C_f/C_g$) |
|---|---|---|---|---|---|---|---|---|---|
| | | Si content | metal | content | metal | content | $\Delta N_d$ | $\Delta \nu_d$ | |
| Ex. 17 | central | 62 | Sn | 20 | Bi | 12 | −0.063 | −0.6 | 0.075 |
| | | | | | Ti | 6 | | | (0.9) |
| | peripheral | 62 | Sn | 0 | Bi | 11 | | | |
| | | | | | Ti | 5.5 | | | |
| Ex. 18 | central | 60 | Ba | 12 | Pb | 20 | −0.075 | −1.0 | 0.15 |
| | | | Ca | 8 | | | | | (1.0) |
| | peripheral | 60 | Ba | 0 | Pb | 17 | | | |
| | | | Ca | 0 | | | | | |
| Ex. 19 | central | 56 | Ga | 15 | Nb | 9 | −0.053 | −0.2 | 0.2 |
| | | | Ge | 5 | Ta | 15 | | | (1.2) |
| | peripheral | 56 | Ga | 0 | Nb | 7 | | | |
| | | | Ge | 0 | Ta | 13 | | | |
| Ex. 20 | central | 55 | Ba | 5 | Ti | 25 | −0.062 | −0.4 | 0.067 |
| | | | La | 7 | Zr | 8 | | | (2.75) |
| | peripheral | 55 | Ba | 3 | Ti | 20 | | | |
| | | | La | 0 | Zr | 7 | | | |

(mol % as oxide conversion at a position that absolute amount of metal dopant g is maximum)

These optical elements are excellent in the chromatic aberration correction.

Although the above examples are concerned with the radial gradient index optical element, even when the present invention is applied to an axial gradient index optical element, a higher effect can be obtained.

What is claimed is:

1. A gradient index optical element, comprising: at least one first metal dopant g selected from the group consisting of La, Y, Ga, In, Ge, Sn, Zn, Zr, Ba, Ca, As, Sr, Gd and Be and distributed in a medium with a slope, and at least one second metal dopant f selected from the group consisting of Bi, Sb, Nb, Ti, Ta, Pb, Tl, Zr, In, Sn, Y, Ba, Ca and Sr different from the first metal dopant g and distributed in the same direction as the first metal dopant g with a slope smaller than that of the first metal dopant g.

2. The gradient index optical element according to claim 1, wherein the first metal dopant g is selected from the group consisting of La, Ga, In, Ge, Sn, Zn and Zr, and the second metal dopant f is selected from the group consisting of Bi, Sb, Nb, Ti, Ta, Pb and Tl.

3. The gradient index optical element according to claim 1, wherein the first metal dopant g is selected from the group consisting of Ba, Ca, As, Sr, Y and Gd, and the second metal dopant f is selected from the group consisting of Bi, Sb, Nb, Ti, Ta, Pb, Tl, Zr, In and Sn.

4. The gradient index optical element according to claim 1, wherein the first metal dopant g is Be and the second metal dopant f is selected from the group consisting of Bi, Sb, Nb, Ti, Ta, Pb, Tl, Zr, In, Sn, Y, Ba, Ca and Sr.

5. The gradient index optical element according to claim 1, wherein the first and second metal dopants g and f are distributed in such a manner that an absolute amount of each dopant is largest in a central portion of the optical element and decreases in an approximately parabolic shape toward the surface of the optical element.

6. The gradient index optical element according to claim 1, wherein the first and second metal dopants g and f are distributed in such a manner that an absolute amount of each dopant is smallest in a central portion of the optical element and increases in an approximately parabolic shape toward the surface of the optical element.

7. The gradient index optical element according to claim 1, wherein the maximum value of content of the first metal dopant g as an oxide conversion is 5–40 mol % and the maximum value of content of the second metal dopant f as an oxide conversion is 2–40 mol %.

8. A gradient index optical element, comprising: at least one first metal dopant g selected from the group consisting of As, La, In and Y and at least one second metal dopant f selected from the group consisting of Bi, Sb, Nb, Ti, Ta, Pb and Tl, in which the first metal dopant g and the second metal dopant f are distributed in the same direction in a medium and a content of the second metal dopant f is not less than 20 mol % in a greatest portion of the second metal dopant distribution.

9. The gradient index optical element according to claim 8, wherein the first and second metal dopants g and f are distributed in such a manner that an absolute amount of each dopant is largest in a central portion of the optical element and decreases in an approximately parabolic shape toward the surface of the optical element.

10. The gradient index optical element according to claim 8, wherein the first and second metal dopants g and f are distributed in such a manner that an absolute amount of each dopant is smallest in a central portion of the optical element and increases in an approximately parabolic shape toward the surface of the optical element.

11. The gradient index optical element according to claim 8, wherein the maximum value of content of the first metal dopant g as an oxide conversion is 5–40 mol % and the maximum value of content of the second metal dopant f as an oxide conversion is 2–40 mol %.

12. A gradient index optical element, comprising: at least one first metal dopant selected from the group consisting of La, Y, Ga, In, Ge, Sn, Zn, Zr, Ba, Ca, As, Sr, Gd and Be, the first metal dopant being distributed at a concentration gradient in a medium, the concentration gradient of the first metal dopant defining a slope having a direction; and at least one second metal dopant different from the first metal dopant and selected from the group consisting of Bi, Sb, Nb, Ti, Ta, Pb, Tl, Zr, In, Sn, Y, Ba, Ca and Sr, the second metal dopant being distributed at a concentration gradient in the medium, the concentration gradient of the second metal dopant defining a slope smaller than the slope of the concentration gradient of the first metal dopant, and the slope of the concentration gradient of the second metal dopant being in the same direction as the slope of the concentration gradient of the first metal dopant.

13. A gradient index optical element according to claim 12; wherein the first metal dopant is selected from the group consisting of La, Ga, In, Ge, Sn, Zn and Zr; and the second metal dopant is selected from the group consisting of Bi, Sb, Nb, Ti, Ta, Pb and Tl.

14. A gradient index optical element according to claim 12; wherein the first metal dopant is selected from the group consisting of Ba, Ca, As, Sr, Y and Gd; and the second metal dopant is selected from the group consisting of Bi, Sb, Nb, Ti, Ta, Pb, Tl, Zr, In and Sn.

15. A gradient index optical element according to claim 12; wherein the first metal dopant is Be; and the second metal dopant is selected from the group consisting of Bi, Sb, Nb, Ti, Ta, Pb, Tl, Zr, In, Sn, Y, Ba, Ca and Sr.

16. A gradient index optical element according to claim 12; wherein the first and the second metal dopants are distributed so that an absolute amount of each dopant is largest in a central portion of the optical element and decreases in an approximately parabolic shape toward the surface of the optical element.

17. A gradient index optical element according to claim 12; wherein the first and the second metal dopants are distributed so that an absolute amount of each dopant is smallest in a central portion of the optical element and increases in an approximately parabolic shape toward the surface of the optical element.

18. A gradient index optical element according to claim 12; wherein a maximum value of content of the first metal dopant as an oxide conversion is 5–40 mol % and a maximum value of content of the second metal dopant as an oxide conversion is 2–40 mol %.

19. A gradient index optical element, comprising: at least one first metal dopant selected from the group consisting of As, La, In and Y, the first metal dopant being distributed in a medium and having a concentration gradient defining a slope having a direction; and a second metal dopant selected from a group consisting of Bi, Sb, Nb, Ti, Ta, Pb and Tl, the second metal dopant being distributed in the medium and having a concentration gradient defining a slope having the same direction as the slope of the concentration gradient of the first metal dopant, and a content of the second metal dopant being at least 20 mol % at a greatest portion of the second metal dopant distribution.

20. A gradient index optical element according to claim 19; wherein the first and the second metal dopants are distributed so that an absolute amount of each dopant is largest in a central portion of the optical element and decreases in an approximately parabolic shape toward the surface of the optical element.

21. A gradient index optical element according to claim 19; wherein the first and the second metal dopants are distributed so that an absolute amount of each dopant is smallest in a central portion of the optical element and increases in an approximately parabolic shape toward the surface of the optical element.

22. A gradient index optical element according to claim 19; wherein a maximum value of content of the first metal dopant as an oxide conversion is 5–40 mol % and a maximum value of content of the second metal dopant as an oxide conversion is 2–40 mol %.

* * * * *